US011215714B2

(12) United States Patent
Sasaki et al.

(10) Patent No.: US 11,215,714 B2
(45) Date of Patent: Jan. 4, 2022

(54) DECEIVING SIGNAL DETECTION SYSTEM AND DECEIVING SIGNAL DETECTION METHOD

(71) Applicant: SUBARU CORPORATION, Tokyo (JP)

(72) Inventors: Yutaka Sasaki, Tokyo (JP); Akitoshi Sakaguchi, Tokyo (JP); Akihiro Yamane, Tokyo (JP); Toshiyuki Narahashi, Tokyo (JP); Yoichi Onomura, Tokyo (JP); Kumiko Kindaichi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 238 days.

(21) Appl. No.: 16/186,299

(22) Filed: Nov. 9, 2018

(65) Prior Publication Data

US 2019/0179033 A1 Jun. 13, 2019

(30) Foreign Application Priority Data

Dec. 11, 2017 (JP) .............................. JP2017-236559

(51) Int. Cl.
*G01S 19/21* (2010.01)
*G01S 19/48* (2010.01)
(Continued)

(52) U.S. Cl.
CPC ............ *G01S 19/215* (2013.01); *G01S 19/37* (2013.01); *G01S 19/48* (2013.01); *H04K 3/228* (2013.01);
(Continued)

(58) Field of Classification Search
CPC ................................ G01S 19/215; H04K 3/90
See application file for complete search history.

(56) References Cited

U.S. PATENT DOCUMENTS 6,259,398 B1 * 7/2001 Riley ...................... G01S 19/44
342/357.26
6,710,739 B1 3/2004 Loegering
(Continued)

FOREIGN PATENT DOCUMENTS

JP 2001280997 A * 10/2001
JP 2006-513084 A 4/2006

OTHER PUBLICATIONS

Jafarnia-Jahromi et al. "GPS Vulnerability to Spoofing Threats and a Review of Antispoofing Techniques." Hindawi Publishing Corp. International Journal of Navigation and Observation. vol. 2012. Article ID 127072. 16 pages. (Year: 2012).*

*Primary Examiner* — Gregory C. Issing
(74) *Attorney, Agent, or Firm* — Troutman Pepper Hamilton Sanders LLP

(57) ABSTRACT

A deceiving signal detection system includes a first antenna, a second antenna, and a signal processor. The first antenna is configured to receive at least four radio wave signals. The signal processor determines that the radio wave signals are the deceiving signals by determining that a relative positional relation between the first antenna and the second antenna calculated on a basis of the radio wave signals deviates from an actual relative positional relation between the first antenna and the second antenna by more than a predetermined amount, and also determines whether an orientation of the aircraft determined based on positions of the first antenna and the second antenna matches an orientation of the aircraft calculated based on an inertial navigation system.

6 Claims, 4 Drawing Sheets

(51) Int. Cl.
*G01S 19/37* (2010.01)
*H04K 3/00* (2006.01)

(52) U.S. Cl.
CPC .......... *H04K 3/90* (2013.01); *H04K 2203/10* (2013.01); *H04K 2203/32* (2013.01)

(56) References Cited

U.S. PATENT DOCUMENTS

| | | | | |
|---|---|---|---|---|
| 7,221,312 | B2 * | 5/2007 | Yee | G01S 19/215 |
| | | | | 342/357.59 |
| 7,310,062 | B1 * | 12/2007 | Hwang | G01S 19/215 |
| | | | | 342/357.59 |
| 7,564,401 | B1 * | 7/2009 | Strachan | G01S 19/215 |
| | | | | 342/357.29 |
| 10,054,687 | B2 * | 8/2018 | Whitehead | G01S 19/215 |
| 10,162,060 | B2 * | 12/2018 | Jaeckle | G01S 19/215 |
| 10,677,933 | B1 * | 6/2020 | Gavrilets | G01S 19/15 |
| 2015/0116146 | A1 * | 4/2015 | Dickman | G01S 19/23 |
| | | | | 342/357.51 |
| 2015/0226858 | A1 * | 8/2015 | Leibner | H04K 3/90 |
| | | | | 342/357.59 |
| 2017/0192103 | A1 * | 7/2017 | Kundak | G01S 19/53 |

\* cited by examiner

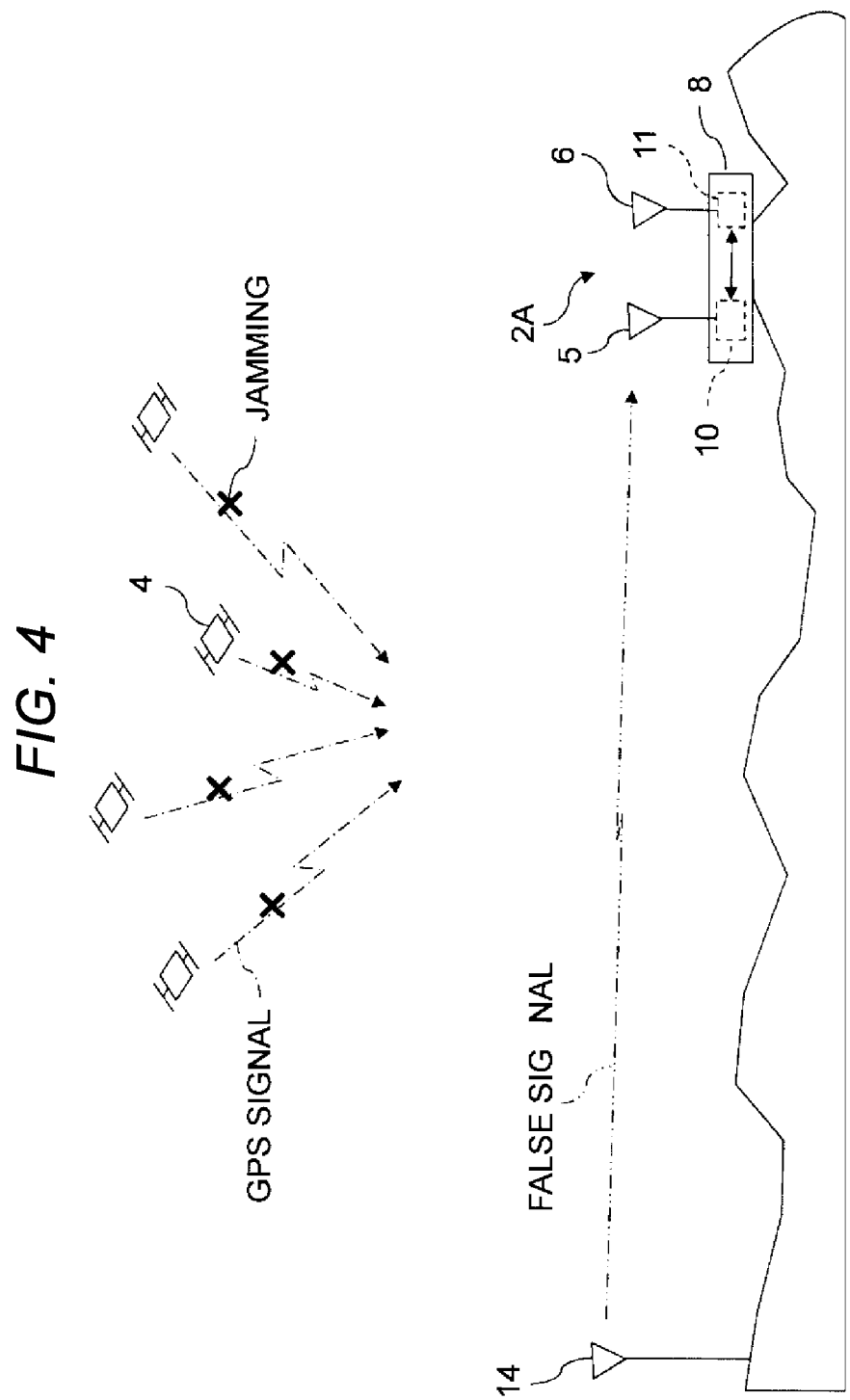

DECEIVING SIGNAL DETECTION SYSTEM AND DECEIVING SIGNAL DETECTION METHOD

CROSS-REFERENCE TO RELATED APPLICATIONS

The present application claims priority from Japanese Patent Application No. 2017-236559 filed on Dec. 11, 2017, the entire contents of which are hereby incorporated by reference.

BACKGROUND

1. Technical Field

Examples of the present invention relate to a deceiving signal detection system, a deceiving signal detection method, a deceiving signal detection program, a navigation system, and a navigation method.

2. Related Art

A navigation system using the Global Positioning System (i.e., GPS) operated by the United States of America has been known as a famous system for guiding a mobile body such as an aircraft to a destination. A GPS-based navigation system is a system for detecting the spatial position of a mobile body on which a GPS receiver is mounted by receiving radio waves from a plurality of GPS satellites with a GPS receiver. The official name of GPS satellites is NAVSTAR (i.e., Navigation Satellite with Time and Ranging).

Since GPS satellites fly at an altitude of about 20,000 km, the strength of GPS signals is weak compared to the strength of radio signals for other data links. Therefore, a GPS signal may be difficult to receive when a radio disturbance occurs in the ionosphere due to a solar flare or when an interfering radio wave is transmitted as well as when a failure occurs in the GPS satellite. Radio jamming due to deceiving signals disguised as GPS signals has also been reported. To address this, systems for preventing interference during navigation using GPS signals have been proposed in Japanese Unexamined Patent Application Publication (Translation of PCT Application) (JP-T) No. 2006-513084.

Global Navigation Satellite Systems (i.e., GNSS) using artificial satellites, such as GPS, includes other systems such as Russian GLONASS (i.e., Global'naya Navigatsionnnaya Sputnikovaya Sistema) and the Galileo planned by the European Union. More overly, a navigation satellite system (i.e., NSS) that covers a particular region are referred to as RNSS (i.e., Regional Navigation Satellite Systems).

Currently, many mobile navigation systems, such as aircrafts, rely on GPS. Therefore, development of a navigation system that does not rely on a navigation system using GPS has been considered.

As a specific example, the German Aerospace Center (DLR: Deutsches Zentrum fuer Luft- and Raumfahrt) has proposed a navigation system called LDACS-NAV using L-band Digital Aeronautical Communications System (LDACS).

LDACS is a high-speed data link system using radio wave signals wirelessly transmitted from a base station installed on the ground, and the LDACS-NAV is a navigational system for receiving navigation signals, being wirelessly transmitted from the base station installed on the ground, by a mobile body such as an airplane, so as to specify the spatial positions including latitude, longitude, and altitude of the mobile body based on the received navigation signals.

In LDACS, radio wave signals in a frequency band different from the frequency band of GPS signals is used. Therefore, LDACS-NAV is expected to be an alternative to GPS-based navigational systems when GPS satellites fail or when solar flares cause radio disturbances in the ionosphere, as well as when GPS deceiving signals are transmitted.

In addition to LDACS-NAV, a navigation system using distance-measuring apparatus (DME), a navigation system using Pseudolite (PL), and the like have been proposed.

DME is equipment that performs two-way communication for transmitting radio wave signals in response to requests from aircrafts and is installed on the ground. By measuring the time taken for the radio wave signal transmitted from the DME to reach the aircraft, the distance between the aircraft and the DME installed on the ground may be measured. Therefore, the spatial position of an aircraft may be specified based on radio wave signals transmitted from a plurality of DMEs.

On the other hand, PL is equipment that wirelessly transmits a PL signal similar to a GPS signal as a radio wave signal, and is installed on the ground. On the other hand, PL is equipment that wirelessly transmits a PL signal similar to a GPS signal as a radio wave signal, and is installed on the ground. Therefore, the spatial position of the aircraft may be specified based on PL signals transmitted from a plurality of PLs.

SUMMARY OF THE INVENTION

An aspect of the present invention provides a deceiving signal detection system including: a first antenna, a second antenna, and a signal processor. The first antenna is configured to receive four or more multiple navigation signals. Each of the multiple navigation signals indicates a transmitting position and a transmitting time of the each navigation signal. The second antenna is configured to receive the multiple navigation signals. The signal processor is configured to determine whether four or more multiple radio wave signals that are received by the first antenna and the second antenna and each indicate a transmitting position and a transmitting time of the each radio wave signal are the multiple navigation signals or deceiving signals.

An aspect of the present invention provides a navigation system including the above-described deceiving signal detection system. The signal processor is detects the position of the mobile body on a basis of the multiple navigation signals.

An aspect of the present invention provides a deceiving signal detection method. The method includes receiving at a first antenna multiple four or more radio wave signals. Each of the radio wave signals indicates a transmitting position and a transmitting time of the each radio wave signal. The method includes receiving the multiple radio wave signals at a second antenna. The method includes determining whether the multiple radio wave signals are navigation signals or deceiving signals on a basis of the multiple radio wave signals received by the first antenna and the multiple radio wave signals received by the second antenna.

An aspect of the present invention provides a non-transitory storage medium that includes a deceiving signal detection program embodied in the storage medium. The deceiving signal detection program causing, when executed by a computer the computer to implement a method. The method includes obtaining multiple four or more radio wave signals received with a first antenna. Each of the multiple radio wave signals indicates a transmitting position and a transmitting time of the each radio wave signal. The method includes obtaining the multiple radio wave signals received with a second antenna. The method includes determining whether the multiple radio wave signals are navigation signals or deceiving signals on a basis the multiple radio wave signals received by the first antenna and the multiple radio wave signals received by the second antenna.

An aspect of the present invention provides a navigation method includes receiving at a first antenna disposed in a mobile body multiple four or more radio wave signals. Each of the multiple radio wave signals indicates a transmitting position and a transmitting time of the each radio wave signal. The method includes receiving the multiple radio wave signals at a second antenna disposed in the mobile body. The method includes determining whether the multiple radio wave signals are navigation signals or deceiving signals on a basis of the multiple radio wave signals received by the first antenna and the multiple radio wave signals received by the second antenna. The method includes detecting a position of the mobile body on a basis of the multiple radio wave signals determined to be navigation signals.

An aspect of the present invention provides a deceiving signal detection system including: a first antenna, a second antenna, and circuitry. The first antenna is configured to receive four or more multiple navigation signals. Each of the multiple navigation signals indicates a transmitting position and a transmitting time of the each navigation signal. The second antenna is configured to receive the multiple navigation signals. The circuitry is configured to determine whether four or more multiple radio wave signals that are received by the first antenna and the second antenna and each indicate a transmitting position and a transmitting time of the each radio wave signal are the multiple navigation signals or deceiving signals.

BRIEF DESCRIPTION OF THE DRAWINGS

FIG. 4 is a configuration diagram of a deceiving signal detection system according to a second example of the present invention.

DETAILED DESCRIPTION

In the following, some preferred examples of the present invention are described in detail with reference to the accompanying drawings. Note that the following description is directed to illustrative examples of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

Although various alternative systems for navigation systems utilizing GPS signals have been proposed as described above, there is no known technique for detecting whether a navigation signal, such as a GPS signal, is a deceiving signal. While navigation by an alternative system is possible when a navigation signal such as a GPS signal cannot be received by a mobile body such as an aircraft, proper navigation of the aircraft or the like cannot be performed when a false navigation signal having sufficient strength is transmitted. There has been an actual case in which a deceiving signal of a GPS signal was transmitted in a state in which the control data link was disturbed, which turns out the flight position of the aircraft being controlled.

It is therefore desirable to enable to detect the false signals, disguised navigation signals such as disguised GPS signals.

First Example (Configuration and Function of Navigation System and Deceiving Signal Detection System)

Figure 1:
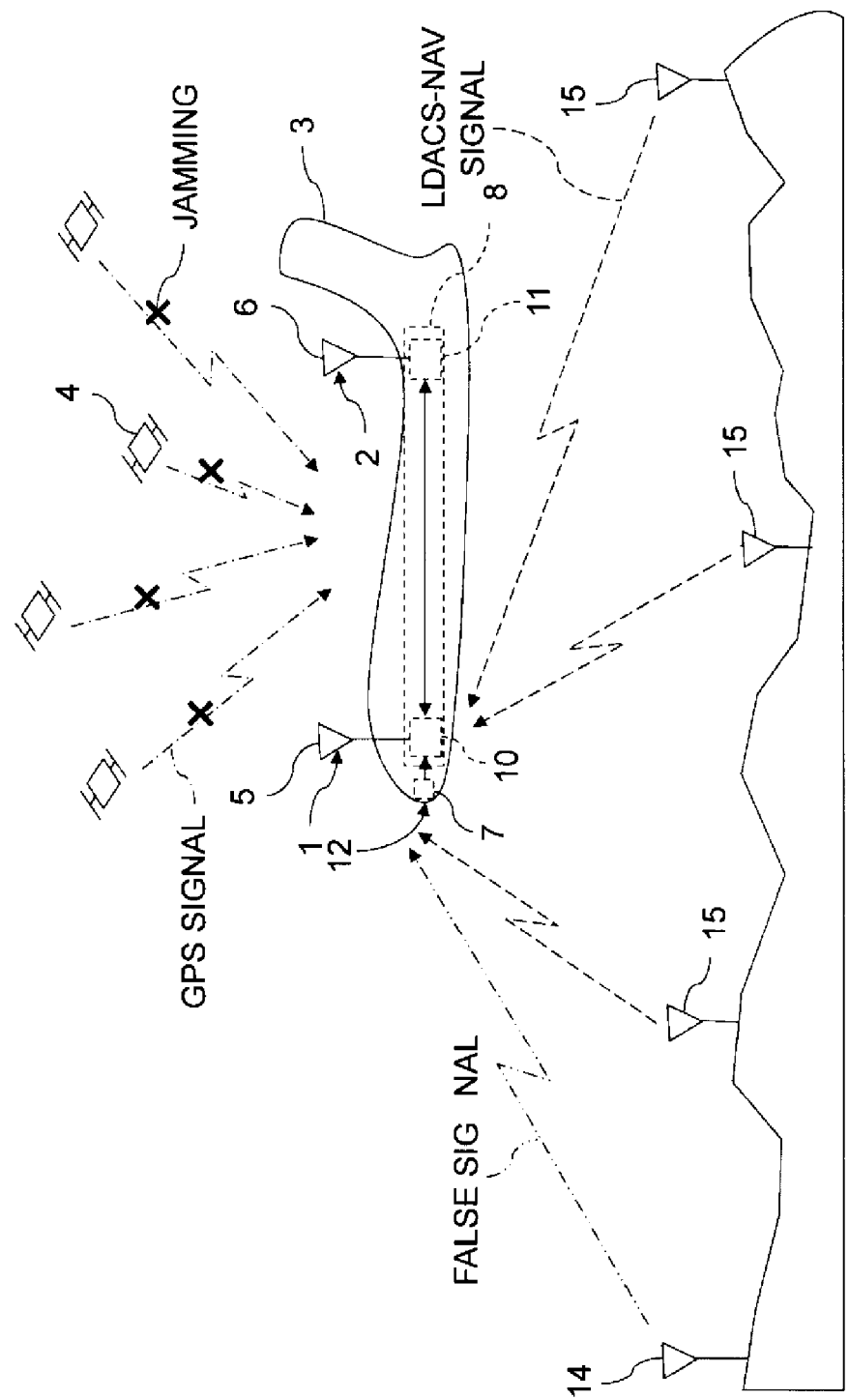
FIG. 1 is a configuration diagram of a navigation system including a deceiving signal detection system according to a first example of the present invention.
Figure 2:
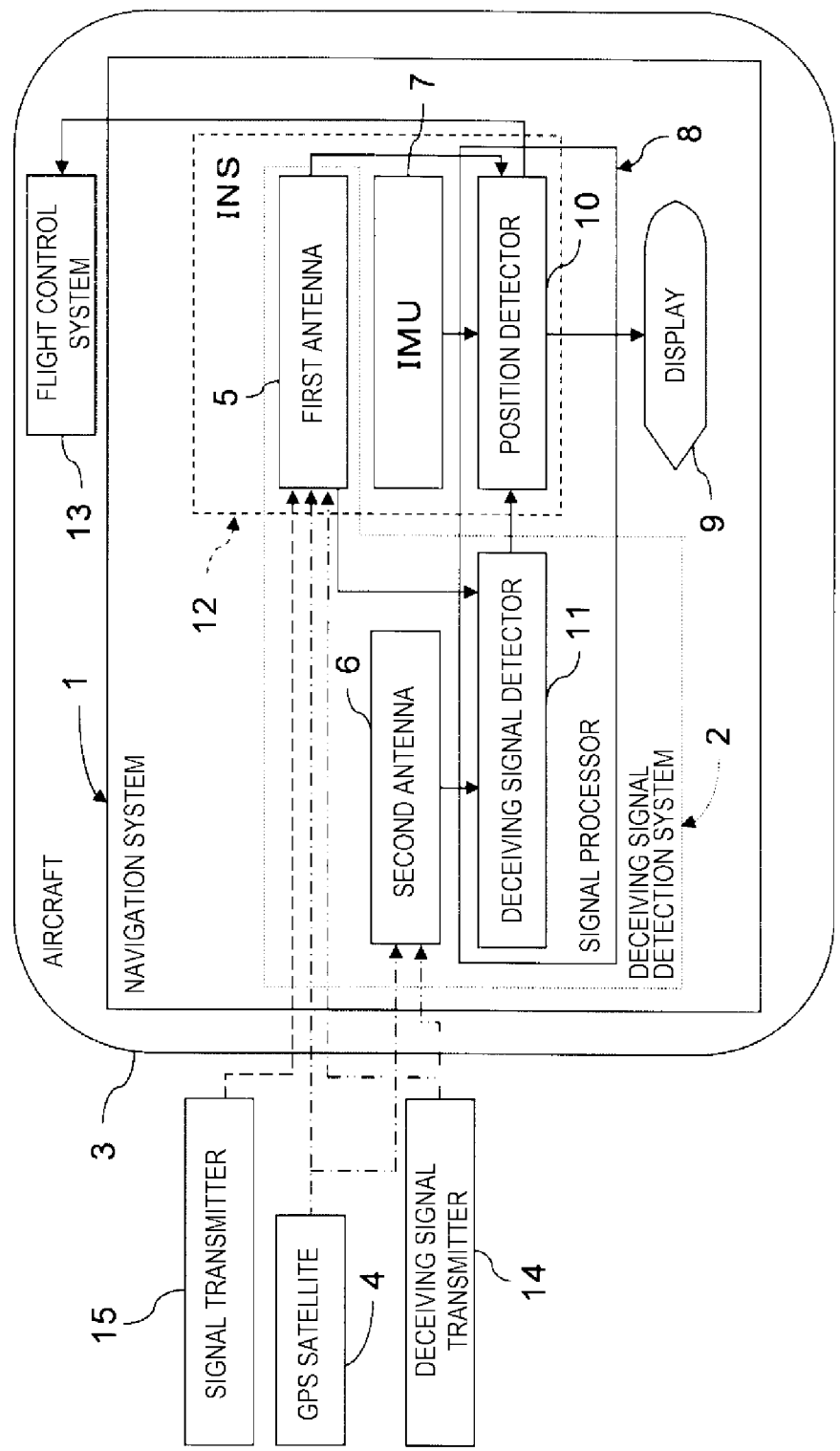
FIG. 2 is a detailed configuration diagram of the navigation system illustrated in FIG. 1.

FIG. 1 is a configuration diagram of a navigation system including a deceiving signal detection system according to a first example of the present invention, and FIG. 2 is a detailed configuration diagram of the navigation system illustrated in FIG. 1.

The navigation system 1 is a system configured to receive a navigation signal transmitted as a radio wave signal and navigates a mobile body based on the received navigation signal. Accordingly, the navigation system 1 is mounted on the mobile body.

The navigation system 1 incorporates a deceiving signal detection system 2 for detecting whether a received radio signal is a deceiving signal disguised as a navigation signal. If the navigation signal received by the navigation system 1 is called a navigation signal including a case where the radio signal is a deceiving signal, the deceiving signal detection system 2 is a system for determining whether the navigation signal received by the navigation system 1 is a deceiving signal. Hereinafter, the navigation signal will be referred to as a navigation signal including a case where the radio wave signal received by the navigation system 1 is a deceiving signal.

Examples of mobile bodies include unmanned aircrafts and manned aircrafts 3 as illustrated in FIG. 1. The aircraft 3 may be either a fixed-wing aircraft or a rotating-wing aircraft. Other examples of mobile bodies include spacecraft (e.g., missiles, rockets, satellites, etc.), ships, automobiles, and the like. Hereinafter, a case where the mobile body to be navigated by the navigation system 1 is an aircraft 3 will be described as an example.

A GPS signal may be used as the navigation signal for navigating the aircraft 3, as is typically employed, but other navigation signals may also be used. Specific examples include GNSS signals such as GLONASS signals and Galileo signals, as well as PL signals and LDACS-NAV signals. Further, an alternative navigation signal may be used to navigate the aircraft 3 in case the primary navigation signal used to navigate the aircraft 3 is determined to be a deceiving signal by the deceiving signal detection system 2.

Hereinafter, an example of the navigation system 1 will be described in which a GPS signal transmitted from a GPS satellite 4 is used as a main navigation signal, and a LDACS-NAV signal may be used as a secondary navigation signal when a false radio wave signal disguised as a GPS signal is detected in the deceiving signal detection system 2.

The navigation system 1 and the deceiving signal detection system 2 may comprise a first antenna 5, a second antenna 6, an inertial measurement unit (IMU) 7, a signal processor 8, and a display 9. In the example illustrated in FIG. 2, the display 9 is provided on the aircraft 3, but in case of the aircraft 3 being an unmanned aircraft to be remotely controlled, the display 9 may be provided on a controller for remote control of the aircraft 3. Further, the IMU 7 may be omitted when the mobile body to be navigated by the navigation system 1 is not an aircraft 3.

The first antenna 5 and the second antenna 6 are both antennas for receiving GPS signals transmitted as radio wave signals from a plurality (i.e., on the order of tens) of GPS satellites 4 located at different positions. The first antenna 5 and the second antenna 6 are arranged at different positions of the aircraft 3 at a sufficient distance apart so as to be able to detect a difference in reception times of GPS signals.

The GPS signal transmitted from each GPS satellite 4 includes the spatial position of the GPS satellite 4 represented by latitude, longitude, and altitude (i.e., the transmitting position of the GPS signal), and the transmitting time of the GPS signal. In order to specify the spatial position of the aircraft 3, it is necessary for the first antenna 5 to receive GPS signals originating from at least four GPS satellites 4. Therefore, the first antenna 5 and the second antenna 6 sequentially receive GPS signals indicating the transmitting positions of four or more multiple GPS signals and the transmitting time of signals from the respective positions.

The IMU 7 is a sensor such as a gyro, an angular velocity meter for sensing angular velocities and accelerations in three directions of the aircraft 3, and can therefore determine the orientation and the like of the aircraft 3.

The signal processor 8 may comprise electronic circuits including an A/D converter (analog-to-digital converter). The portion of the signal processor 8 that processes digital information after A/D conversion may be configured by an electronic circuit such as a computer that reads a program.

Specifically, the signal processor 8 may be configured so as to be provided with a function for detecting the position of the aircraft 3 by enabling a computer to read a navigation program of the aircraft 3. Further, by enabling the computer to read a deceiving signal detection program, the signal processor 8 is provided with a deceiving signal detection function for determining whether a radio wave signal received by the first antenna 5 and the second antenna 6 is an authentic GPS signal or a deceiving signal disguised as a GPS signal.

That is, the signal processor 8 functions as a position detector 10 and a deceiving signal detector 11. The position detector 10 of the signal processor 8, together with the first antenna 5 and the IMU 7, constitutes an inertial navigation system (INS) 12 which utilizes a GPS signal or a LDACS-NAV signal to improve detection accuracy of the position of the aircraft 3. On the other hand, the deceiving signal detector 11 of the signal processor 8 constitutes the deceiving signal detection system 2 together with the first antenna 5 and the second antenna 6.

The INS 12 is a system for calculating the orientation, position, and velocity of the aircraft 3 based on angular velocity and acceleration in three directions of the aircraft 3 detected by the IMU 7, and for offsetting the position of the aircraft 3 based on the GPS signal or the LDACS-NAV signal received by the first antenna 5. That is, the position detector 10 has a function of calculating the orientation, position, and speed of the aircraft 3 based on angular velocity and acceleration of the aircraft 3 obtained from the IMU 7, a function of calculating the position of the aircraft 3 based on the GPS signal or the LDACS-NAV signal received by the first antenna 5, and a function of correcting the position of the aircraft 3, being calculated by the IMU 7, with the position of the aircraft 3, being calculated based on the GPS signal or the LDACS-NAV signal.

Calculation of the position of the aircraft 3 based on the GPS signals can be performed based on GPS signals transmitted from at least four GPS satellites 4 at different orbital positions. Specifically, the spatial position of the aircraft 3 at the reception time of the GPS signals, being received by the first antenna 5, can be detected based on the position information of the multiple GPS satellites 4 specified based on the GPS signals, and based on the time differences between the GPS satellites 4 from the transmitting time of each GPS signal to the reception time by the first antenna 5.

Then, the position of the aircraft 3 that is calculated by the IMU 7 is corrected based on the spatial position of the aircraft 3 that is detected based on the GPS signals, so that the position of the aircraft 3 can be determined with high accuracy. As a result, the aircraft 3 can be navigated with sufficient accuracy.

For example, if the aircraft 3 is an unmanned aircraft or a manned aircraft, both being under auto-pilot modes, the INS 12 position detector 10 may output highly accurate position information of the aircraft 3 to a flight control system 13 of the aircraft 3, the position information being detected and corrected based on the GPS signals. This allows the flight control system 13 to automatically control the aircraft 3 such that the aircraft 3 cruises along a predetermined cruise path of the aircraft 3.

On the other hand, if the aircraft 3 is an unmanned aircraft remotely controlled by an operator or a manned aircraft controlled by a pilot, the highly accurate position information of the aircraft 3 may be output to the display 9, the position information being detected and corrected based on the GPS signals. As a result, the operator of the aircraft 3 can steer the aircraft 3 while referring to the position information of the aircraft 3 displayed on the display 9.

However, if a deceiving signal disguised as a GPS signal is transmitted from a deceiving signal transmitter 14 on the ground or on the sea, it becomes difficult to accurately detect the position of the airplane 3 since the INS 12 calculates the position based on the deceiving signal. A deceiving signal of a GPS signal can be generated by superimposing multiple radio wave signals simulating a GPS signal with predetermined time differences as if the signal was multiple GPS signals transmitted from multiple GPS satellites 4. Therefore, by adjusting the time differences among the multiple signal components superimposed on the deceiving signal, it is possible to cause the INS 12 of the aircraft 3 to detect the false position of the aircraft 3.

Moreover, the deceiving signal can be easily transmitted from a deceiving signal transmitter 14 with the power higher than strength of an authentic GPS signal. Further, by generating radio jamming, a GPS signal may not be received easily since the strength of GPS signals is small. Therefore, when a deceiving signal of the GPS signal is transmitted, the INS 12 detects the position of the airplane 3 based on the deceiving signal.

Thus, the deceiving signal detection system 2 determines whether the GPS signal is a deceiving signal, and the position detector 10 of the INS 12 is configured to halt the detection with relying on the GPS signal of the aircraft 3 position, when the GPS signal is determined to be a deceiving signal. The aircraft 3 may then be maneuvered based on the position of the aircraft 3 calculated in the IMU 7 provided in the INS 12 without using GPS signals. That is, the position of the aircraft 3 calculated by the IMU 7 provided in the INS 12 may be used as is for navigating the aircraft 3 without corrections.

Alternatively, when it is determined that the GPS signal is a deceiving signal, the position detector 10 of the INS 12 may detect the position of the airplane 3 based on the LDACS-NAV signal, which is a well-known navigational signal based on a communication protocol different from the communication protocol of the GPS signal. That is, the navigation signal for correcting the position of the airplane 3 calculated by the IMU 7 can be switched from the GPS signal to the LDACS-NAV signal having a different frequency or the like.

This makes it possible to avoid erroneous guidance of the aircraft 3 even if a deceiving signal of the GPS signal is received by the first antenna 5. In particular, if the LDACS-NAV signal is used as a substitute signal for the GPS signal, the accuracy of detecting the position of the airplane 3 can be maintained.

The calculation of the position of the airplane 3 based on the LDACS-NAV signal can be performed based on the LDACS-NAV signal transmitted from at least four signal transmitters 15 installed at different positions on the ground or on the sea. Specifically, similarly to the calculation of the position of the aircraft 3 based on the GPS signal, the spatial position of the aircraft 3 at the reception time of the LDACS-NAV signals received by the first antenna 5 can be detected based on the position information of the multiple signal transmitters 15 specified from the LDACS-NAV signal, and based on the time differences of the signal transmitting devices 15, each time difference being between the transmitting time of each LDACS-NAV signal and the reception time by the first antenna 5.

It should be noted that a signal transmitter 15 of the LDACS-NAV signal may be disposed at sea by mooring the signal transmitter 15 to the seafloor by an anchor buoy, as described in Japanese patent application No. 2017-224072. In this case, since the positions of the signal transmitters 15 at sea are likely to change, each of the signal transmitters 15 may be provided with a function of detecting the position of itself by communicating with three or more transponders fixed to the seafloor, without using the GPS signal.

On the other hand, the deceiving signal detector 11 constituting the deceiving signal detection system 2 has a function of detecting whether the multiple GPS signals are the multiple signal components constituting the deceiving signal based on the multiple GPS signals received by the first antenna 5 and the multiple GPS signals received by the second antenna 6. That is, the deceiving signal detector 11 has a function of verifying the multiple GPS signals which may be multiple signal components constituting the deceiving signal.

As described above, the multiple authentic GPS signals required for detecting the spatial position of the aircraft 3 are transmitted from the multiple GPS satellites 4 at different positions, whereas the multiple signal components superimposed on the deceiving signal simulating the multiple GPS signals are transmitted from a deceiving signal transmitter 14 installed at one position. As a result, when the deceiving signal is received by the first antenna 5 and the second antenna 6, it is possible to detect that a difference in arrival time of the multiple signal components constituting the deceiving signal is different from a difference in arrival time of the multiple authentic GPS signals.

That is, when multiple authentic GPS signals are received by the first antenna 5 and the second antenna 6, an arrival time of each GPS signal transmitted from the GPS satellite 4 to the first antenna 5 and an arrival time of the GPS signal to the second antenna 6 will be different not only with respect to other GPS signals but also with respect to the first antenna 5 and the second antenna 6. In other words, the combination of the arrival time differences of the multiple GPS signals should be different with respect to the first antenna 5 and the second antenna 6.

This is because the distance from the first antenna 5 to each GPS satellite 4 is different from the distance from the second antenna 6 to each GPS satellite 4. That is, a difference corresponding to the distance between the first antenna 5 and the second antenna 6 appears in the combination of arrival time differences of the multiple GPS signals.

Therefore, the reception time of each authentic GPS signal transmitted at the same time will be different in the first antenna 5 and the second antenna 6, while the transmitting time of each authentic GPS signal received at the same time at the first antenna 5 and at the second antenna 6 might be also different.

On the other hand, when the multiple signal components constituting the deceiving signal are received by the first antenna 5 and the second antenna 6, the reception time differences of the multiple signal components associated with the same transmitting time are the same at the first antenna 5 and at the second antenna 6, while the transmitting time differences associated with the multiple signal components received at the same time by the first antenna 5 and by the second antenna 6 are the same at the first antenna 5 and at the second antenna 6. In other words, the multiple signal components received by the first antenna 5 and the second antenna 6 are signal components that are temporally offset by the distance between the first antenna 5 and the second antenna 6.

Therefore, by detecting the characteristics of the multiple signal components constituting the deceiving signal, it is possible to determine whether four or more multiple radio wave signals indicating the transmitting position and the transmitting time of the signals received by the first antenna 5 and the second antenna 6 are the multiple GPS signals transmitted from different GPS satellites 4 or deceiving signals disguised as GPS signals.

As a specific example, when a difference in arrival time between the transmitting time and the reception time, being read from the multiple radio wave signals received by the first antenna 5 matches a difference in arrival time of the multiple radio wave signals received by the second antenna 6, it is determined that the multiple radio wave signals are multiple signal components constituting a deceiving signal.

Alternatively, instead of comparing the differences in arrival time and the reception time of the multiple radio wave signals received by the first antenna 5 and the second antenna 6, the positions of the first antenna 5 and the second antenna 6 may be calculated based on the multiple radio wave signals received. It may be checked whether the calculated distance between the positions of the first antenna 5 and the second antenna 6 is the same as the actual distance, and whether the orientation of the aircraft 3, being specified based on the positions of the first antenna 5 and the second antenna 6, matches the orientation of the aircraft 3 that is calculated by the INS 12.

That is, when the relative position of the first antenna 5 and the second antenna 6, being calculated based on the multiple radio wave signals received by the first antenna 5 and the second antenna 6, deviates from the actual relative position of the first antenna 5 and the second antenna 6 by more than a predetermined amount, it may be determined that the multiple radio wave signals are multiple signal components constituting a deceiving signal.

By comparing only the actual distance with the distance between the first antenna 5 and the second antenna 6, which is calculated based on the multiple radio wave signals received by the first antenna 5 and the second antenna 6, the deceiving signal may be detected with a certain degree of accuracy.

However, depending on the relative positional relationship among the deceiving signal transmitter 14, the first antenna 5, and the second antenna 6, such as a case in which the deceiving signal transmitter 14, the first antenna 5, and the second antenna 6 are aligned on the same straight line, it may not rule out such a possibility that the distance between the first antenna 5 and the second antenna 6 calculated based on the multiple radio wave signals received by both the first antenna 5 and the second antenna 6 becomes substantially the same as the actual distance. Therefore, the detection accuracy of the deceiving signal may be improved not only by comparing the distances between the first antenna 5 and the second antenna 6, but also by comparing the relative positions by vector expressions, including the direction of one with respect to the other, with the actual relative position. The actual relative position between the first antenna 5 and the second antenna 6 can be calculated geometrically based on the orientation of the aircraft 3 calculated by the INS 12 (i.e., the orientation of the aircraft 3 relative to a reference orientation) and the actual relative distance between the first antenna 5 and the second antenna 6. Therefore, the deceiving signal detector 11 may be provided with: a function of calculating the relative position of the first antenna 5 and the second antenna 6 based on the multiple radio wave signals received by the first antenna 5 and the second antenna 6; a function of calculating the actual relative position between the first antenna 5 and the second antenna 6 based on the orientation of the airplane 3 calculated by the INS 12 and the actual distance between the first antenna 5 and the second antenna 6, and a function of detecting the deceiving signal by comparing the relative distance between the first antenna 5 and the second antenna 6 calculated by the aforementioned two calculation methods. In the case where a deceiving signal is detected by another algorithm, a necessary calculation function may be provided in the deceiving signal detector 11.

(Method for Navigating a Mobile Body and Method for Detecting a Deceiving Signal)

Next, a navigation method and a deceiving signal detection method of the aircraft 3 using the navigation system 1 and the deceiving signal detection system 2 will be described.

Figure 3:
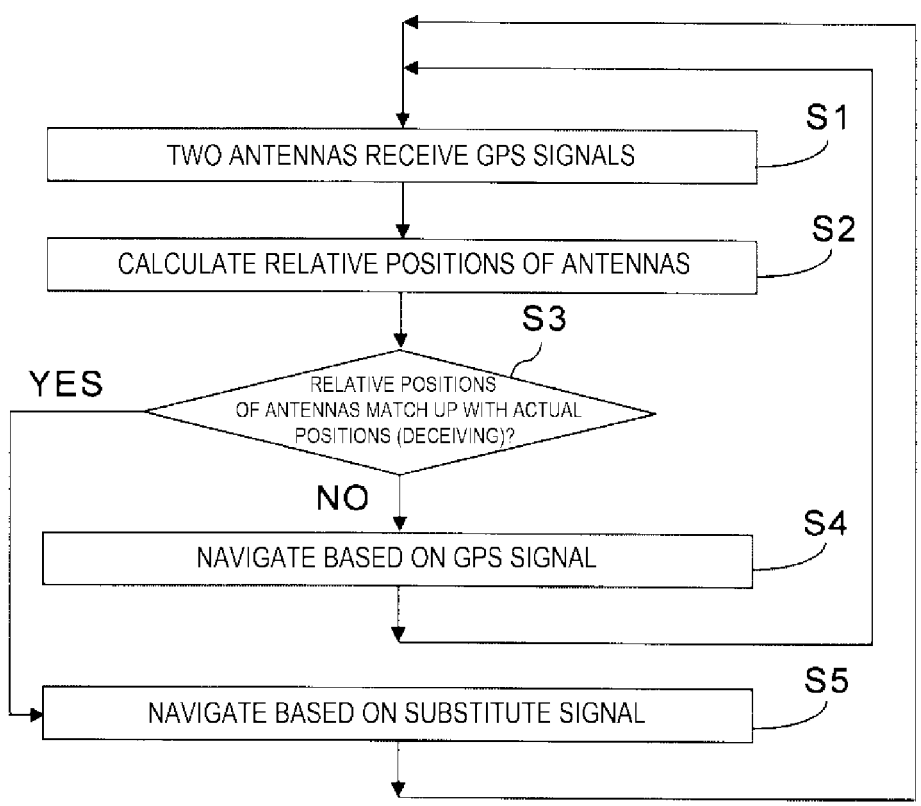
FIG. 3 is a flowchart illustrating a progression during navigation of an aircraft including a determination as to whether a radio signal is an authentic GPS signal or a deceiving signal by the navigation system incorporating the deceiving signal detection system illustrated in FIG. 1.

FIG. 3 is a flowchart illustrating a progression during navigation of an aircraft 3 including a determination as to whether a radio signal is an authentic GPS signal or a deceiving signal by the navigation system 1 incorporating the deceiving signal detection system 2 illustrated in FIG. 1.

First, in step S1, four or more multiple GPS signals are received by the first antenna 5 and the second antenna 6 provided in the aircraft 3. However, the multiple GPS signals received by the first antenna 5 and the second antenna 6 may be multiple signal components constituting a deceiving signal. In other words, the first antenna 5 and the second antenna 6 provided in the aircraft 3 receive four or more multiple radio wave signals to be checked to determine if the signals are multiple signal components constituting a deceiving signal or multiple authentic GPS signals transmitted from different GPS satellites 4.

The deceiving signal detector 11 of the deceiving signal detection system 2 obtains multiple radio wave signals received by the first antenna 5 and the second antenna 6, that is, multiple GPS signals which may be multiple signal components constituting a deceiving signal.

Next, in step S2, the deceiving signal detector 11 calculates the relative position between the first antenna 5 and the second antenna 6 based on the two sets of obtained radio wave signals. That is, since the transmitting position and the transmitting time of the signal can be read from each radio wave signal, the position of the first antenna 5 and the position of the second antenna 6 can be calculated based on the difference in the arrival time from the transmitting time to the reception time of each radio wave signal. As a result, the relative positions of the first antenna 5 and the second antenna 6 can also be calculated.

Next, in step S3, it is determined whether the relative positions of the first antenna 5 and the second antenna 6 calculated based on the multiple GPS signals, being received by the first antenna 5 and the second antenna 6, matches with the actual relative positions of the first antenna 5 and the second antenna 6 specified based on the orientation information of the aircraft 3 calculated by the INS 12. The GPS signals may be the multiple signal components constituting a deceiving signal.

When the relative position of the first antenna 5 and the second antenna 6 matches with the actual relative position of the first antenna 5 and the second antenna 6, it is determined that multiple radio wave signals are the multiple authentic GPS signals. That is, it is verified that the multiple GPS signals received by the first antenna 5 and the second antenna 6 are not deceiving signals.

In this case, in step S4, navigation of the aircraft 3 based on the GPS signal is performed. Specifically, the position detector 10 detects the position of the aircraft 3 based on the multiple GPS signals received by the first antenna 5. The aircraft 3 is then maneuvered based on the detected position of the aircraft 3.

For example, if the aircraft 3 is under an auto-pilot mode, the position of the aircraft 3 detected by the position detector 10 is output to the flight control system 13 of the aircraft 3. This allows the flight control system 13 to automatically control the aircraft 3 such that the aircraft 3 cruises along a predetermined cruise path of the aircraft 3. When the aircraft 3 is manually operated, the position of the aircraft 3 detected by the position detector 10 is displayed on the display 9. As a result, the operator of the aircraft 3 can steer the aircraft 3 while referring to the position information of the aircraft 3 displayed on the display 9.

On the other hand, if the relative position between the first antenna 5 and the second antenna 6 deviates from the actual relative position between the first antenna 5 and the second antenna 6, which is specified based on the orientation information of the aircraft 3 calculated by the INS 12, the multiple GPS signals are determined to be the multiple signal components constituting a deceiving signal.

In this case, in step S5, the process switches to navigation of the aircraft 3 based on a substitute signal. That is, the navigation of the aircraft 3 based on the GPS signal is stopped, and the navigation of the aircraft 3 based on a substitute signal such as a LDACS-NAV signal is executed. Specifically, the position detector 10 detects the position of the aircraft 3 based on the substitute signals such as multiple DACS-NAV signals received by the first antenna 5. The aircraft 3 is then maneuvered based on the detected position of the aircraft 3.

Navigation of the aircraft 3 based on the substitute signals may continue until it is determined in step S3 that the multiple radio wave signals received by the first antenna 5 and the second antenna 6 are authentic GPS signals that are not deceiving signals. In this case, the navigation of the aircraft 3 can be continued without being misguided by a deceiving signal.

In the navigation system 1, the deceiving signal detection system 2, the navigation method, and the deceiving signal detection method described above, the navigation signal such as the GPS signal is received by the first antenna 5 and the second antenna 6 which are arranged apart from each other, and a deceiving signal can be detected by detecting an inconsistency with respect to the arrival time of the signals, which is derived from the deceiving signal disguised as the navigation signal being transmitted from the same position.

Therefore, according to the navigation system 1, the deceiving signal detection system 2, the navigation method, and the deceiving signal detection method, even when a deceiving signal disguised as a navigation signal is transmitted, it is possible to prevent a moving body such as an aircraft 3 from proceeding on an erroneous route. In particular, if an unmanned mobile body is automatically operated using a navigation signal, it is possible to prevent the originator of the deceiving signal from controlling the mobile body, and attempting falling, sinking or stealing of the mobile body.

Second Example

FIG. 4 is a configuration diagram of a deceiving signal detection system according to a second example of the present invention.

The deceiving signal detection system 2A in the second example illustrated in FIG. 4 differs from the deceiving signal detection system 2 in the first example in that the first antenna 5 and the second antenna 6 are provided on a stationary base on the ground or on the sea. Since the configuration and operation of the deceiving signal detection system 2A in the second example are not substantially different from those of the deceiving signal detection system 2 in the first example, the same reference numerals are assigned to the same configurations or corresponding configurations, and descriptions thereof are omitted.

The first antenna 5 and the second antenna 6 constituting the deceiving signal detection system 2A may be installed on a stationary base on the ground or on the sea as long as they are within the coverage area of the navigation signal such as the GPS signal. Even in this case, it is possible to determine whether the radio wave signal received by the first antenna 5 and the second antenna 6 is an authentic navigation signal such as a GPS signal or a deceiving signal disguised as a navigation signal by the same algorithm as in the first example.

As a practical example, the deceiving signal detection system 2A including the first antenna 5 and the second antenna 6 can be installed in a camp site or an observation site operated temporarily, and it can be easily determined whether the radio signal received by the first antenna 5 and the second antenna 6 is a navigation signal or a deceiving signal.

As another example, the first antenna 5 and the second antenna 6 may be attached to a portable terminal constituting the signal processor 8, and the deceiving signal detection system 2A or the navigation system 1 including the deceiving signal detection system 2A may be carried by a user. Alternatively, a small-sized deceiving signal detection system 2A or a small-sized navigation system 1 incorporating the deceiving signal detection system 2A may be configured to be wearable on an animal such as a bird or a dog. In other words, the mobile body on which the navigation system 1 is mounted in the first example may be a moving living things such as a user.

Other Examples

While specific examples have been described above, the described examples are by way of example only and are not intended to limit the scope of the present invention. The novel methods and equipment described herein may be embodied in a variety of other manners. Various omissions, substitutions and changes may be made in the manner of the methods and equipment described herein without departing from the spirit of the present invention. The appended claims and their equivalents include such various forms and modifications falling within the scope and spirit of the present invention.

The invention claimed is:

1. A deceiving signal detection system comprising:
 a first antenna, mounted on an aircraft, configured to receive at least four radio wave signals, each signal indicating a transmitting position and a transmitting time of the signal;
 a second antenna, mounted on the aircraft, configured to receive the at least four radio wave signals,
 an inertial navigation system mounted on the aircraft; and
 a signal processor configured to determine whether the at least four radio wave signals that are received by the first antenna and the second antenna are deceiving signals,
 wherein the signal processor determines that the radio wave signals are the deceiving signals by:
  calculating a relative positional relation between the first antenna and the second antenna based on the radio wave signals, the relative positional relation indicating a calculated distance between the first antenna and the second antenna based on the radio wave signals and also indicating a calculated direction between the first antenna and the second antenna based on the radio wave signals;
  calculating an orientation of the aircraft based on the inertial navigation system;
  calculating an actual relative positional relation between the first antenna and the second antenna based on the orientation of the aircraft and an actual relative distance between the first antenna and the second antenna;
  comparing the relative positional relation and the calculated actual relative positional relation between the first antenna and the second antenna; and
  determining that the at least four radio wave signals are the deceiving signals when the calculated actual relative positional relation deviates from the relative positional relation between the first antenna and the second antenna, wherein, when it is determined that the at least four radio wave signals are deceiving signals, the signal processor detects the position of the aircraft on a basis of another plurality of radio wave signals in conformity with a second communication protocol different from a first communication protocol of the at least four radio wave signals.

2. A navigation system comprising the deceiving signal detection system according to claim 1, wherein
the signal processor detects the position of the aircraft on the basis of the radio wave signals.

3. The navigation system according to claim 2, wherein
the signal processor stops detecting the position of the aircraft on the basis of the radio wave signals when it is determined that the radio wave signals are deceiving signals.

4. A deceiving signal detection method, comprising:
receiving at a first antenna mounted on an aircraft at least four radio wave signals, each of the radio wave signals indicating a transmitting position and a transmitting time thereof;
receiving the at least four radio wave signals at a second antenna;
calculating a relative positional relation between the first antenna and the second antenna based on the at least four radio wave signals, the relative positional relation indicating a calculated distance between the first antenna and the second antenna based on the at least four radio wave signals and also indicating a calculated direction between the first antenna and the second antenna based on the at least four radio wave signals;
calculating an orientation of an aircraft based on an inertial navigation system mounted on the aircraft;
calculating an actual relative positional relation between the first antenna and the second antenna based on the orientation of the aircraft and an actual relative distance between the first antenna and the second antenna;
determining a difference between the relative positional relation and the calculated actual relative positional relation between the first antenna and the second antenna; and
determining that the at least four radio wave signals are deceiving signals when the calculated actual relative positional relation deviates from the relative positional relation between the first antenna and the second antenna,
wherein, when it is determined that the at least four radio wave signals are deceiving signals, the signal processor detects the position of the aircraft on a basis of another plurality of radio wave signals in conformity with a second communication protocol different from a first communication protocol of the at least four radio wave signals.

5. A non-transitory storage medium that includes a deceiving signal detection program embodied therein, the deceiving signal detection program causing, when executed by a computer, the computer to implement a method, the method comprising:
obtaining at least four radio wave signals received with a first antenna mounted on an aircraft, each of the radio wave signals indicating a transmitting position and a transmitting time thereof;
obtaining the at least four radio wave signals received with a second antenna mounted on the aircraft;
calculating a relative positional relation between the first antenna and the second antenna based on the at least four radio wave signals, the relative positional relation indicating a calculated distance between the first antenna and the second antenna based on the at least four radio wave signals and also indicating a calculated direction between the first antenna and the second antenna based on the at least four radio wave signals;
calculating an orientation of an aircraft based on an inertial navigation system mounted on the aircraft;
calculating an actual relative positional relation between the first antenna and the second antenna based on the orientation of an aircraft and an actual relative distance between the first antenna and the second antenna, the actual relative distance between the first antenna and the second antenna being stored in the non-transitory storage medium;
determining a difference between the relative positional relation and the calculated actual relative positional relation between the first antenna and the second antenna; and
determining that the at least four radio wave signals are deceiving signals when the calculated actual relative positional relation deviates from the relative positional relation between the first antenna and the second antenna,
wherein, when it is determined that the at least four radio wave signals are deceiving signals, the signal processor detects the position of the aircraft on a basis of another plurality of radio wave signals in conformity with a second communication protocol different from a first communication protocol of the at least four radio wave signals.

6. A navigation method, comprising:
receiving at a first antenna disposed in a mobile body at least four radio wave signals, each of the radio wave signals indicating a transmitting position and a transmitting time thereof;
receiving the at least four radio wave signals at a second antenna disposed in the mobile body;
determining whether the at least four radio wave signals received by the first antenna and the second antenna are navigation signals or deceiving signals by:
calculating a relative positional relation between the first antenna and the second antenna based on the at least four radio wave signals, the relative positional relation indicating a calculated distance between the first antenna and the second antenna based on the at least four radio wave signals and also indicating a calculated direction between the first antenna and the second antenna based on the at least four radio wave signals;
calculating an orientation of the mobile body based on an inertial navigation system mounted on the mobile body;
calculating an actual relative positional relation between the first antenna and the second antenna based on the orientation of the mobile body and the actual relative distance between the first antenna and the second antenna;
determining a difference between the relative positional relation and the calculated actual relative positional relation between the first antenna and the second antenna;
determining that the at least four radio wave signals are the deceiving signals when the calculated actual relative positional relation deviates from the relative positional relation between the first antenna and the second antenna; and determining that the at least four radio wave signals are the navigation signals when the calculated actual relative positional relation does not deviate from the relative positional relation between the first antenna and the second antenna; and
detecting the position of the mobile body when the at least four radio wave signals are determined to be navigation signals,
wherein, when it is determined that the at least four radio wave signals are deceiving signals, the signal processor detects the position of the mobile body on a basis of another plurality of radio wave signals in conformity with a second communication protocol different from a first communication protocol of the at least four radio wave signals.

* * * * *